(12) United States Patent
Matthews et al.

(10) Patent No.: US 9,937,447 B2
(45) Date of Patent: Apr. 10, 2018

(54) THREADED SAFETY CAP

(71) Applicant: Halliburton Energy Services, Inc., Houston, TX (US)

(72) Inventors: Kenneth Heidt Matthews, Kingwood, TX (US); Andrew David Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 14/322,976

(22) PCT Filed: Sep. 23, 2013

(86) PCT No.: PCT/US2013/061128
§ 371 (c)(1),
(2) Date: Jul. 13, 2014

(87) PCT Pub. No.: WO2015/041692
PCT Pub. Date: Mar. 26, 2015

(65) Prior Publication Data
US 2015/0246299 A1   Sep. 3, 2015

(51) Int. Cl.
*B01D 25/00* (2006.01)
*B01D 29/03* (2006.01)
*E21B 43/08* (2006.01)

(52) U.S. Cl.
CPC .............. *B01D 29/03* (2013.01); *E21B 43/08* (2013.01)

(58) Field of Classification Search
CPC .. B01D 29/05; B01D 35/02; B01D 2201/301; B01D 35/31; B01D 2201/34; B01D 2201/302; B01D 2201/304; B65D 51/1616; B65D 50/062; Y10S 292/02; C02F 1/003; C02F 2307/02
(Continued)

(56) References Cited

U.S. PATENT DOCUMENTS

| 4,538,452 A | 9/1985 | Hrvojic | |
|---|---|---|---|
| 5,176,276 A * | 1/1993 | Ballu | F16J 13/24 |
| | | | 220/240 |

(Continued)

FOREIGN PATENT DOCUMENTS

| WO | 2013112306 A2 | 8/2013 |
|---|---|---|
| WO | 2015041692 A1 | 3/2015 |

OTHER PUBLICATIONS

International Search Report and Written Opinion for PCT/US2013/061128 dated Jun. 10, 2014.
(Continued)

*Primary Examiner* — Claire A Norris
(74) *Attorney, Agent, or Firm* — McDermott Will & Emery LLP

(57) ABSTRACT

Disclosed is a threaded safety cap for a high pressure, high temperature filter press. One disclosed filter press includes a cell having an open end, a cap configured to be threadably coupled to the open end and comprising a retaining ring defining a central orifice and a cap seal having a longitudinal extension configured to extend through the central orifice, one or more filtration components, and one or more seals, wherein, then the cap is threadably coupled to the cell, the cap secures the one or more seals and the one or more filtration components within the cell.

10 Claims, 3 Drawing Sheets

(58) Field of Classification Search
USPC ............... 210/455, 451, 339; 215/308, 277; 220/315, 371
See application file for complete search history.

(56) References Cited

U.S. PATENT DOCUMENTS

| | | | |
|---|---|---|---|
| 5,221,483 A * | 6/1993 | Glenn | ................... A61L 2/0017 210/321.64 |
| 5,309,761 A | 5/1994 | Ravi et al. | |
| 5,609,757 A * | 3/1997 | Schiavo | ................. B01D 35/31 210/232 |
| 2010/0139914 A1 | 6/2010 | Tehrani et al. | |
| 2011/0011788 A1* | 1/2011 | Bradshaw | ............... E21B 21/06 210/323.1 |
| 2013/0193142 A1 | 8/2013 | Jamison et al. | |

OTHER PUBLICATIONS

Examination Report received in corresponding Australian Application No. 2013400689, dated Aug. 30, 2016.
Examination Report received in corresponding Australian Application No. 2013400689, dated May 19, 2016.

* cited by examiner

THREADED SAFETY CAP

BACKGROUND

The present disclosure is related to fluid testing equipment and, more particularly, to a threaded safety cap for a high pressure, high temperature filter press used to test fluids in the oil and gas industry.

In the oil and gas industry, high-pressure, high-temperature filter presses are commonly used to test the filtration properties of drilling fluids, cement slurries, fracturing fluids, and other fluids used in the exploration and production of hydrocarbons. Conventional filter presses typically include a pressure vessel or cell that receives the fluid to be tested and may be heated and pressurized in order to simulate common downhole conditions. After testing the sample fluid, one or more valves associated with the cell are opened to evacuate the pressure built up in the cell. Filtrate from the sample fluid, however, can often times clog the inlet and output ports of the cell, thereby allowing residual pressures exceeding 100 psi to remain inside the cell. In some cases, this relatively small amount of pressure is enough to eject the cap from the cell with considerable force and velocity.

The caps used on conventional filter presses are typically secured in place via one or more grub screws that pass through the cell and into corresponding detents formed in the cap. These screws, however, may be disengaged while residual pressure remains within the cell. If one or more screws is disengaged while the cell retains residual pressure, the cap may be forcefully ejected or launched from the pressure vessel. As can be appreciated, this can cause potential harm to the operator if he or she is not aware of the residual pressure and can also potentially undermine the functionality of the cell.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to fluid testing equipment and, more particularly, to a threaded safety cap for a high pressure, high temperature filter press used to test fluids in the oil and gas industry.

The exemplary embodiments disclosed herein provide a two-piece cap design for a high-temperature, high-pressure filter press. The cap includes a retaining ring that is threaded to a cell and a cap seal that is captured by the retaining ring within the cell and serves to compress and secure one or more internal seals and filtration components therein. Advantageously, the cap seal does not rotate with respect to the filtration components during assembly, thereby preventing potential damage to the fragile filter paper included in the filtration components. The threaded design of the cap may also prove advantageous in allowing any residual pressures to be released when unthreading the retaining ring from the cell. When under load, the threadings of each of the retaining ring and the cell prevent the retaining ring from reverse-rotating on its own. As a result, an operator is able to slowly unthread the retaining ring from the cell in order to allow the residual pressure to gradually bleed off to atmospheric pressures, without risking ejection of the cap. One or more venting ports may also be included in the design of the filter press and configured to provide fluid communication between the interior of the cell and the surrounding environment when the cap is reversed off the cell a predetermined distance, thereby further reducing the residual pressure of the cell.

Another advantageous feature of the disclosed embodiments is corresponding markings defined or otherwise provided on the outer surfaces of the retaining ring and the cell. By taking into account the geometry of the threadings on the cap and cell and the manufacturer recommended minimum percentage of compression for the seals in the filter press, the markings may be strategically placed on the outer surfaces of the cell and the retaining ring to provide a visual indication to an operator that the seals are adequately compressed.

Figures 1A, 1B:
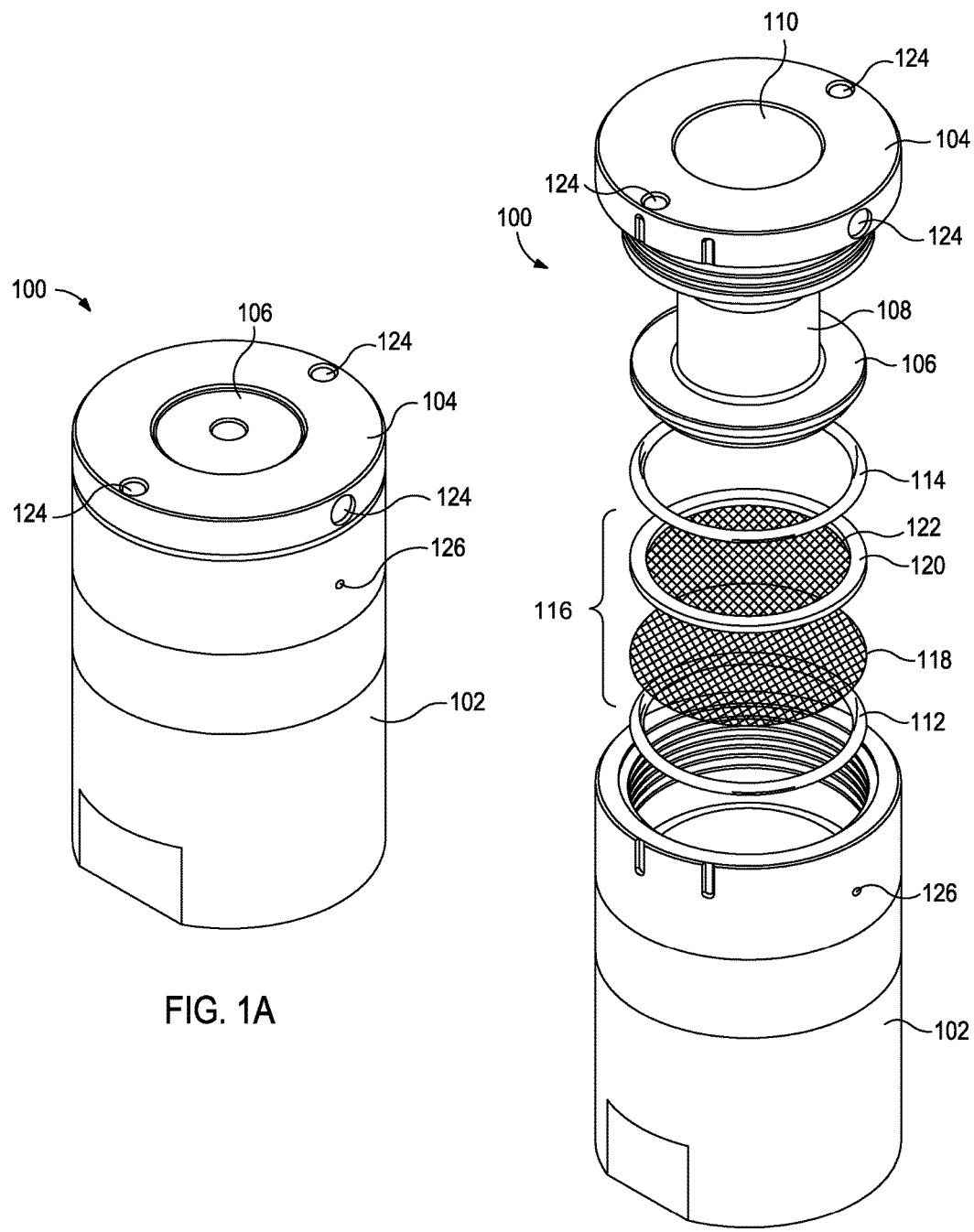
FIGS. 1A and 1B illustrate isometric and exploded isometric views, respectively, of an exemplary filter press that may employ one or more principles of the present disclosure.

Referring to FIGS. 1A and 1B, illustrated are isometric and exploded isometric views, respectively, of an exemplary filter press 100 that may employ one or more principles of the present disclosure. The filter press 100 may be used to test filtration properties of various fluids, such as fluids commonly used in the oil and gas industry (e.g., drilling fluids, cement slurries, fracturing fluids, etc.). The filter press 100 may also be capable of testing such fluids at elevated temperatures and pressures, such that common downhole conditions may be simulated for the particular fluid being tested.

As illustrated, the filter press 100 may generally include a cell 102, a retaining ring 104, and a cap seal 106. The cell 102 may be a generally cylindrical structure having an open end configured to receive and secure the retaining ring 104 and the cap seal 106 therein. As will be discussed in greater detail below, the retaining ring 104 and the cap seal 106 may be characterized as a two-piece cap configured to be threadably coupled or otherwise attached to the cell 102. Each of the cell 102, the retaining ring 104, and the cap seal 106 may be made of a rigid material, such as grade 304 or 316 stainless steel, or other materials suitable for use at elevated temperatures and pressures.

As best seen in FIG. 1B, the cap seal 106 may include a longitudinal extension 108 configured to extend through a central orifice 110 defined in the retaining ring 104 when the filter press 100 is properly assembled. The filter press 100 may further include a pressure seal 114, a filter seal 112, and one or more filtration components 116 configured to be sealed within the cell 102 between the pressure seal 114 and the filter seal 112. The filtration components 116 may include, but are not limited to, filter paper 118 and a mesh screen 120 that exhibits a fine wire mesh 122. As described below, the filtration components 116 may be compressed between the pressure seal 114 and the filter seal 112 as the filter press 100 is assembled.

In one or more embodiments, the retaining ring 104 may include or otherwise define one or more tool cavities 124

(three shown). The tool cavities 124 may provide locations on the outer surface the retaining ring 104 where a tool (not shown), such as a spanner wrench or the like, may be attached and used to rotate the retaining ring 104. The cell 102 may also include or otherwise define one or more venting ports 126 (one shown). As described in greater detail below, the venting ports 126 may extend through the wall of the cell 102 to provide fluid communication between the interior of the cell 102 and the surrounding environment when the cap (i.e., the retaining ring 104 and the cap seal 106) is reversed off of the cell 102 a predetermined distance.

Figure 2:
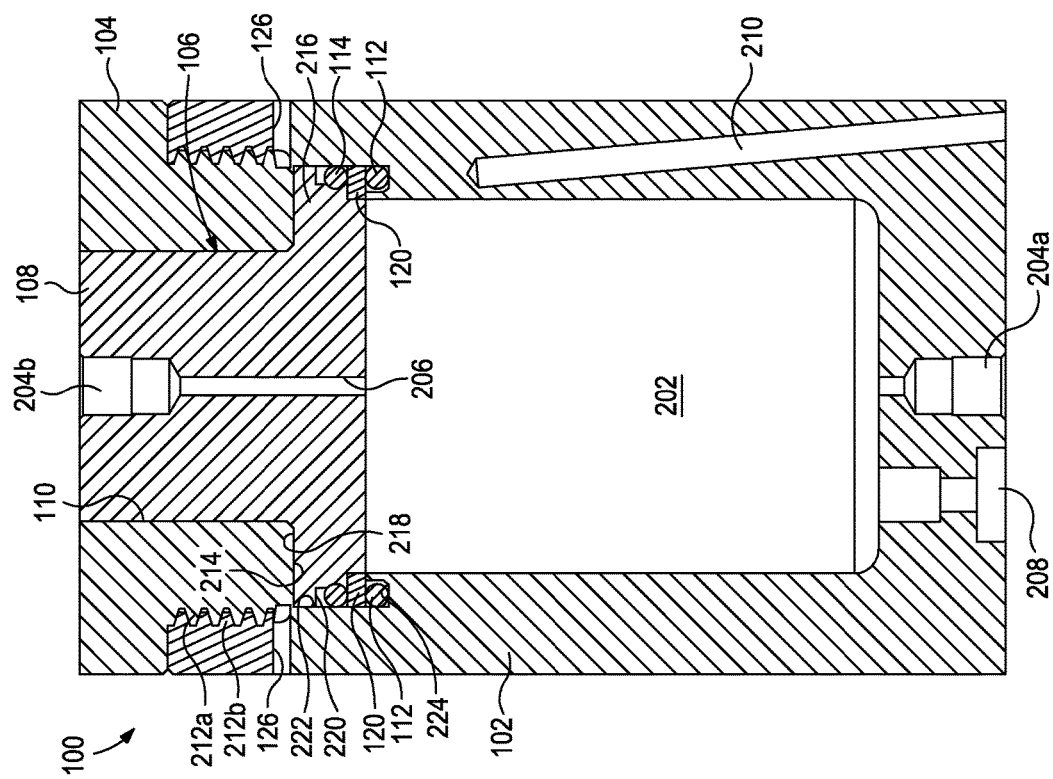
FIG. 2 illustrates a cross-sectional side view of the filter press of FIGS. 1A and 1B as assembled, according to one or more embodiments.

Referring now to FIG. 2, with continued reference to FIGS. 1A and 1B, illustrated is a cross-sectional side view of the filter press 100 as assembled, according to one or more embodiments. The cell 102 may have or otherwise define an interior chamber 202 into which a sample fluid (not shown) to be tested by the filter press 100 may be introduced. When the filter press 100 is assembled, the interior chamber 202 may fluidly communicate with an inlet port 204a defined in one end of the cell 102 and an outlet port 204b defined in the cap seal 106. A conduit 206 defined in the longitudinal extension 108 of the cap seal 106 places the outlet port 204b in fluid communication with the interior chamber 202 when the cap seal 106 is installed on the cell 102. Pressure may be introduced into the interior chamber 202 via the inlet port 204a, and filtrate that has passed through the filtration components 116 (FIG. 1B) may exit the interior chamber 202 via the conduit 206 and the outlet port 204b.

The cell 102 may further define or otherwise provide a sensor port 208 and a channel 210. The sensor port 208 may provide a location for coupling a pressure indicating device (i.e., sensor, gauge, etc.) to the cell 102 in order to obtain real-time pressure measurements. The channel 210 may be defined in the wall of the cell 102, for example, and configured to receive a temperature probe (not shown) therein, such as a thermocouple or the like, in order to obtain real-time temperature measurements corresponding to the temperature within the interior chamber 202.

As illustrated, a portion of the retaining ring 104 may be threaded and configured to threadably engage corresponding threads defined on a portion of the cell 102. More particularly, the retaining ring 104 may include or otherwise define a first threading 212a and the cell 102 may include or otherwise define a second threading 212b configured to mate with or otherwise threadably engage the first threading 212a. In FIG. 2, the first threading 212a is depicted as an exterior threading on the retaining ring 104, and the second threading 212b is depicted as an interior threading on the cell 102. It will be appreciated, however, that the first and second threadings 212a,b may be reversed, without departing from the scope of the disclosure. Indeed, embodiments are also contemplated herein where the first threading 212a is defined on an interior surface of the retaining ring 104, and the second threading 212b is defined on an exterior surface of the cell 102.

The retaining ring 104 may define or otherwise provide a bottom surface 214 and the cap seal 106 may provide a shoulder 216 that extends radially from the longitudinal extension 108 and defines a top surface 218 configured to axially oppose the bottom surface 214. In assembling the filter press 100, the top surface 218 of the shoulder 216 may be configured to engage the bottom surface 214 of the retaining ring 104. More specifically, as the retaining ring 104 is threaded to the cell 102, the bottom surface 214 may be brought into contact with the top surface 218, thereby securing the cap seal 106 to the cell 102 and preventing its removal from the filter press 100.

Figure 3:
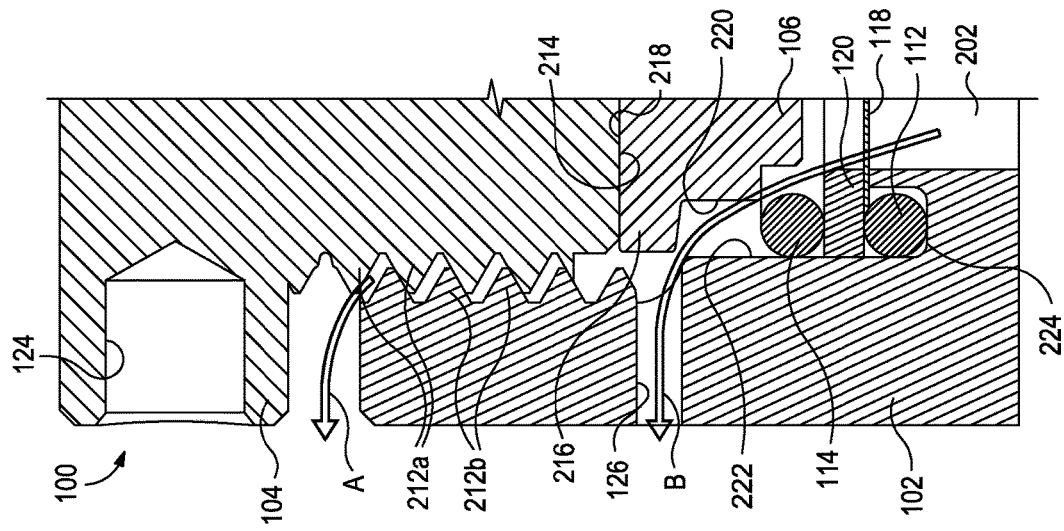
FIG. 3 depicts an enlarged cross-sectional view of a portion of the filter press of FIG. 2.

As best seen in FIG. 3, the cap seal 106 may further provide a groove 220 defined in the shoulder 216 and the cell 102 may define a corresponding groove 222 in its inner wall. The grooves 220, 222 may be configured to cooperatively accommodate at least the filter seal 112, the pressure seal 114, the filter paper 118, and the mesh screen 120 therein during assembly of the filter press 100. The cell 102 may further define an annular channel 224 configured to receive and retain the filter seal 112 therein. As the retaining ring 104 is threaded to the cell 102, and the bottom surface 214 is correspondingly brought into engagement with the top surface 218 of the of the cap seal 106, the cap seal 106 may progressively compress the pressure seal 114, the filter paper 118, and the mesh screen 120 within the grooves 220, 222 such that each component is secured within the cell 102. Moreover, compressing the pressure seal 114, the filter paper 118, and the mesh screen 120 may also serve to compress the filter seal 11 within the annular channel 224 and substantially prevent its removal therefrom.

The filter press 100 utilizes purposeful geometry of the two-piece cap design (i.e., the retaining ring 104 and the cap seal 106) to minimize or eliminate damage caused to the filter paper 118 during assembly. For instance, the retaining ring 104 is rotated to threadably engage the cell 102 while the cap seal 106 generally does not rotate. As the retaining ring 104 is rotated and threaded to the cell 102, its bottom surface 214 slidingly engages the top surface 218 of the cap seal 106 and thereby gradually pushes the cap seal 106 deeper and/or further into the cell 102. Accordingly, the cap seal 106 generally remains rotationally stationary as it progressively compresses the filter seal 112, the filter paper 118, and the mesh screen 120 within the cell 102. As a result, the non-rotating cap seal 106 generally constrains the rotation of the filter paper 118 during assembly. If the cap seal 106 were to rotate, such as would be case with a threaded cap seal 106, the bottom of the cap seal 106 would contact and potentially rotate the mesh screen 120 and, in turn, twist and damage the filter paper 118. Accordingly, the exemplary filter press 100 disclosed herein may prove advantageous in providing a generally stationary cap seal 106 that prevents rotational damage to the filter paper 118 during assembly.

In exemplary operation of the filter press 100, a sample fluid may be introduced into the interior chamber 202 to be tested. The two-part cap (i.e., the retaining ring 104 and the cap seal 106) may be installed on the cell 102, as generally described above, such that the pressure seal 114 and the filter seal 112 generate a fluid-tight seal within the cell 102. Once the retaining ring 104 and the cap seal 106 are properly installed and the cell 102 is sealed, the interior chamber 202 may be pressurized via the inlet port 204a in order to test various properties of the sample fluid. Filtrate that passes through the filter paper 118 and the mesh screen 120 may travel through the conduit 206 and out of the filter press 100 via the outlet port 204b to be analyzed.

In some embodiments, the first and second threadings 212a,b may be coarse threads, such as Acme threads, trapezoidal threads, or the like. In other embodiments, the first and second threadings 212a,b may be fine threads. In yet other embodiments, the threadings 212a,b may be any type of helical-based fastening mechanism, without departing from the scope of the disclosure. When under load, such as when the interior chamber 202 of the cell 102 is pressurized for testing, the first and second threadings 212a,b may be configured to resist rotation because of the high frictional forces created between the opposing threaded surfaces. As a result, the friction between these two parts may help prevent the two-part cap (i.e., the retaining ring 104 and the cap seal 106) from reverse rotating during operation and thereby damaging the filter paper 118.

Following testing operations, pressure within the interior chamber 202 may be released or otherwise reduced via one or more valves or valving (not shown) associated with the inlet and outlet ports 204a,b. As discussed above, however, even though appropriate valving has been operated to reduce the pressure in the interior chamber 202, residual pressures up to and potentially exceeding 100 psi may nonetheless remain within the interior chamber 202. This may be the result of solids or other debris from the sample fluid clogging the inlet and/or outlet ports 204a,b of the filter press 100, and thereby trapping fluid pressure within the interior chamber 202. Unless the residual pressure is decreased or otherwise eliminated, removing the retaining ring 104 and the cap seal 106 from the cell 102 may cause one or both to launch from the cell 102, and potentially harm the operator or cause damage to the filter press 100. According to the present disclosure, when the pressure in the cell 102 has been reduced to benign levels using the valving associated with the inlet and outlet ports 204a,b, any residual pressures remaining within the cell 102 may be safely released without launching the retaining ring 104 and the cap seal 106.

Referring now to FIG. 3, illustrated is an enlarged cross-sectional view of a portion of the filter press 100, according to one or more embodiments. More specifically, FIG. 3 depicts the two-part cap (i.e., the retaining ring 104 and the cap seal 106) in the process of being removed or otherwise unthreaded from the cell 102. As the retaining ring 104 is gradually unthreaded from the cell 102, the residual fluid pressure within the interior chamber 202 maintains the top surface 218 of the cap seal 106 in sliding contact with the bottom surface 214 of the retaining ring 104, thereby correspondingly moving the cap seal 106 in the same direction. As the cap seal 106 advances out of the cell 102 along with the retaining ring 104, the radial shoulder 216 of the cap seal 106 may gradually move out of compressive engagement with the pressure seal 114, the filter paper 118, and the mesh screen 120. As a result, a portion of the residual pressure within the interior chamber 202 may be relieved through the threadings 212a,b of the cell 102 and the retaining ring 104, as generally indicated by the arrow A.

More particularly, once the cap seal 106 moves out of compressive engagement with the filter seal 112, and the pressure seal 114 is no longer able to hold pressure, the residual fluid pressure A may bypass the seals 112, 114 and migrate out of the interior chamber 202 via the tortuous flow path defined by the threadings 212a,b. Because of innate characteristics of the threadings 212a,b when under load (i.e., the high frictional forces created between the opposing threaded surfaces), the threadings 212a,b may be generally prevented from reverse-rotating on their own. Accordingly, an operator may be allowed to slowly unthread the retaining ring 104 from the cell 102 in order to allow the residual pressure to gradually bleed off to atmospheric pressures without risking ejection of the two-part cap (i.e., the retaining ring 104 and the cap seal 106) from the cell 102. While the majority of the depressurization of the internal chamber 202 occurs by increasing the internal volume of the cell 102 by unscrewing the retaining ring 104, the configuration and design of the threadings 212a,b may nonetheless prove advantageous in preventing inadvertent reverse-rotation and launching of the retaining ring 104 and/or the cap seal 106.

Moreover, as the cap seal 106 advances out of the cell 102, the radial shoulder 106 of the cap seal 106 may eventually expose the one or more venting ports 126 (one shown) defined through the wall of the cell 102. As mentioned above, the venting ports 126 may be configured to provide fluid communication between the interior chamber 202 and the surrounding environment when the two-part cap (i.e., the retaining ring 104 and the cap seal 106) is reversed off of the cell 102 a predetermined distance. The predetermined distance, for example, may be a predetermined axial distance that the cap seal 106 must traverse out of the cell 102. In other embodiments, the predetermined distance may encompass a predetermined number of unthreading revolutions of the retaining ring 104, which translates into a corresponding axial distance that the cap seal 106 has reversed out of the cell 102. Once the venting ports 126 are exposed, a portion of the residual fluid pressure may exit the interior chamber 202 via the venting ports 126, as generally indicated by the arrow B. The venting ports 126 may provide the filter press 100 with an additional pressure release mechanism configured to prevent the retaining ring 104 and the cap seal 106 from launching from the cell 102.

Figure 4:
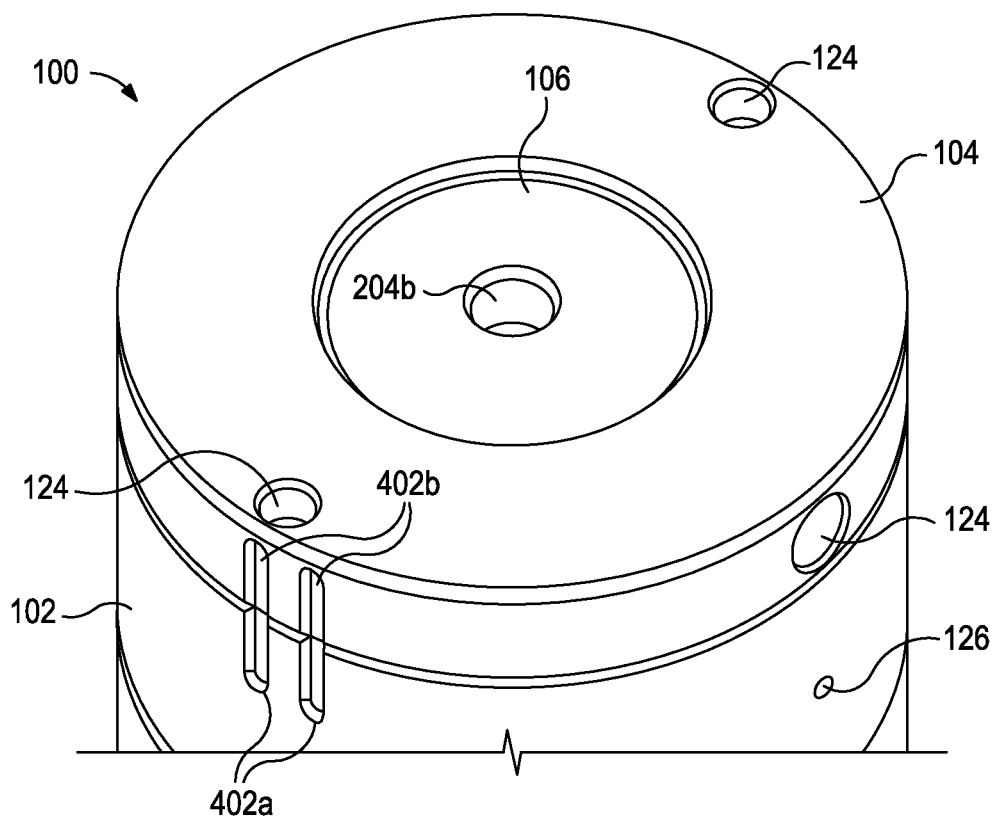
FIG. 4 illustrates an enlarged isometric view of an end of the exemplary filter press of FIGS. 1A and 1B, according to one or more embodiments.

Referring now to FIG. 4, with continued reference to the prior figures, illustrated is an enlarged isometric view of an end of the exemplary filter press 100, according to one or more embodiments. In some embodiments, the filter press 100 may further include a visual indication of suitable or adequate compression of the pressure seal 114 and the filter seal 112 (FIGS. 1B, 2, and 3). More specifically, one or more markings 402 (shown as markings 402a and 402b) may be defined or otherwise provided on the exterior surface of both the cell 102 and the retaining ring 104. In some embodiments, the markings 402a,b may be machined into the outer surface of one or both of the cell 102 and the retaining ring 104. In other embodiments, the markings 402a,b may be welded to or otherwise cast into the body of one or both of the cell 102 and the retaining ring 104. In yet other embodiments, the markings 402a,b may take the form of a sticker, a plastic or metal information plate, or another identifier that may be physically adhered, coupled, or otherwise attached to the outer surface of one or both of the cell 102 and the retaining ring 104. As depicted in FIG. 4, the markings 402a,b are grooves (two grooves defined for each marking 402a,b) defined or otherwise formed in the respective outer surfaces of the cell 102 and the retaining ring 104.

By analyzing and otherwise determining the geometry of the threadings 212a,b (FIGS. 2 and 3), and taking into account the manufacturer recommended minimum percentage of compression for each of the pressure seal 114 and the filter seal 112, the markings 402a,b may be strategically placed on the outer surfaces of the cell 102 and the retaining ring 104 to provide a visual indication that the seals 112, 114 are adequately compressed to withstand testing pressures. More specifically, since the amount of compression on each seal 112, 114 will be directly proportion to the rotation of the retaining ring 104 with respect to the cell 102, the lead and the pitch of the threadings 212a,b may be taken into account to determine and identify exactly how far the retaining ring 104 needs to be rotated to adequately compress the seals 112, 114. This will ensure that the internal fluid passages of the cell 102 are appropriately sealed so accuracy of the testing procedures using the filter press 100 may be preserved.

In one embodiment, for example, determining the correct placement of the markings 402a,b on the cell 102 and the retaining ring 104 may first entail assembling the filter press 100 without the filter and pressure seals 112, 114. Once the filter press 100 is assembled, corresponding and aligned markings (not shown) may be scribed on the respective outer surfaces of the cell 102 and the retaining ring 104. A marking may again be scribed on the outer surface of the cell 102 after reverse-rotating the retaining ring 104 a given angular amount. The difference between the first marking scribed on the retaining ring 104 and the second marking scribed on the cell 102 will denote adequate compression when the filter and pressure seals 112, 114 are placed in the filter press 100.

In exemplary operation, the retaining ring 104 may be threaded onto the cell 102 until the cap seal 106 contacts and begins to compress the filter seal 112. At this point, the retaining ring 104 may be advanced further and rotated until aligning the markings 402a,b on each of the cell 102 and the retaining ring 104. According to the present disclosure, aligning the markings 402a,b on the cell 102 and the retaining ring 104 may apply the required amount of compression on each of the pressure seal 114 and the filter seal 112 and simultaneously provide a visual indication to the operator that such has occurred. Without the markings 402a,b, an operator may risk tightening the filter press 100 to an unsuitable degree that may result in erroneous test results.

Embodiments disclosed herein include:

A. A filter press that includes a cell having an open end, a cap configured to be threadably coupled to the open end and comprising a retaining ring defining a central orifice and a cap seal having a longitudinal extension configured to extend through the central orifice, one or more filtration components, and one or more seals, wherein the cap secures the one or more seals and the one or more filtration components within the cell when threadably coupled to the cell.

B. A method that includes threadably coupling a cap to an open end of a cell, the cap comprising a retaining ring defining a central orifice and a cap seal including a longitudinal extension configured to extend through the orifice, advancing a bottom surface defined on the retaining ring into engagement with a top surface defined on a radial shoulder of the cap seal as the cap is threadably coupled to the cell, securing one or more filtration components and one or more seals within the cell as the cap is threadably coupled to the cell, pressurizing the cell for testing and releasing pressure from the cell following the testing, and releasing residual pressure from the cell by unthreading the cap from the cell, the residual pressure being released before the cap is removed from the cell.

Each of embodiments A and B may have one or more of the following additional elements in any combination: Element 1: wherein the one or more seals comprise at least a filter seal and a pressure seal. Element 2: wherein the cell further defines an annular channel configured to receive and retain the filter seal. Element 3: wherein the one or more filtration components comprise at least filter paper and a mesh screen interposing the filter seal and the pressure seal. Element 4: further comprising one or more venting ports defined in the cell and providing fluid communication between an interior chamber of the cell and a surrounding environment when the cap is reversed out of the cell a predetermined distance. Element 5: further comprising an interior chamber defined within the cell, an inlet port defined in an end of the cell and being in fluid communication with the interior chamber, and an outlet port defined in the cap seal and in fluid communication with the interior chamber via a conduit defined in the longitudinal extension of the cap seal and extending between the outlet port and the interior chamber. Element 6: further comprising a bottom surface defined on the retaining ring, a shoulder extending radially from the longitudinal extension of the cap seal and defining a top surface configured to axially oppose the bottom surface of the retaining ring, a first threading defined on the retaining ring, and a second threading defined on the cell at the open end and configured to threadably engage the first threading, wherein, as the retaining ring is threaded to the cell, the bottom surface is brought into contact with the top surface and thereby secures the cap seal to the cell. Element 7: further comprising a first groove defined in the shoulder, and a second groove defined in an inner wall of the cell, wherein the first and second grooves are configured to cooperatively accommodate the one or more seals and the one or more filtration components, and wherein, as the retaining ring is threaded to the cell, the cap seal progressively compresses the one or more seals and the one or more filtration components at least partially within the first and second grooves. Element 8: wherein the first and second threadings are coarse threads. Element 9: further comprising markings defined on an exterior surface of each of the retaining ring and the cell, the markings being a visual indicator for an operator of sufficient compression of one or more seals. Element 10: wherein the markings are at least one of machined into the exterior surface of one or both of the cell and the retaining ring, welded to or cast into the exterior surface of one or both of the cell and the retaining ring, a sticker, a plastic or metal information plate, and grooves defined in the exterior surface of the cell and the retaining ring.

Element 11: wherein threadably coupling the cap to the open end of the cell comprises engaging a first threading defined on the retaining ring with a second threading defined on the cell at the open end, and rotating the retaining ring in a first direction. Element 12: further comprising threading the retaining ring onto the cell until the cap seal contacts and begins to compress the one or more seals and the one or more filtration components, and continuing rotation of the retaining ring in the first direction until aligning a first marking defined on an outer surface of the retaining ring with a second marking defined on an outer surface of the cell. Element 13: further comprising slidably engaging the bottom surface of the retaining ring with the top surface of the cap seal, the cap seal remaining rotationally stationary with respect to the retaining ring and the one or more filtration devices, and progressively compressing the one or more seals and the one or more filtration devices with the cap seal as the retaining ring rotates. Element 14: wherein releasing the residual pressure from the cell comprises allowing the residual pressure to escape the cell via corresponding threadings defined on the retaining ring and cell. Element 15: further comprising resisting reverse rotation of the retaining ring with respect to the cell with the threadings while the cap is unthreaded from the cell. Element 16: wherein an interior chamber is defined within the cell and releasing the residual pressure from the cell comprises reversing the cap from threaded engagement with the cell a predetermined distance, and allowing the residual pressure to escape the cell via one or more venting ports defined in the cell, the one or more venting ports providing fluid communication between the interior chamber and a surrounding environment when the cap is reversed from threaded engagement with the cell the predetermined distance. Element 17: wherein the one or more seals comprise at least a filter seal and a pressure seal and the one or more filtration components comprise at least filter paper and a mesh screen, and wherein securing the one or more filtration components and the one or more seals within the cell further comprises progressively compressing the filter paper and the mesh screen between the filter seal and the pressure seal with the cap seal.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A filter press, comprising:
   a cell defined by a wall and having an open end;
   a cap configured to be coupled to the open end and comprising a retaining ring and a cap seal, the retaining ring defining a central orifice and providing first threading configured to threadably engage second threading provided on the cell, and the cap seal having a longitudinal extension that extends through the central orifice, wherein the retaining ring rotates independent of the cap seal while threadably engaging the second threading;
   one or more venting ports defined through the wall of the cell and providing fluid communication between an interior chamber of the cell and a surrounding environment, wherein:
      in a sealed state of the cell, at least a seal portion of the cap is disposed in the interior chamber to obstruct the one or more venting ports; and
      in an unsealed state of the cell, the seal portion of the cap is displaced axially apart from the one or more venting ports to permit venting of fluid through the one or more venting ports;
   one or more filtration components; and
   one or more seals, wherein the cap secures the one or more seals and the one or more filtration components within the cell when threadably coupled to the cell.

2. The filter press of claim 1, wherein the one or more seals comprise at least a filter seal and a pressure seal.

3. The filter press of claim 2, wherein the cell further defines an annular channel configured to receive and retain the filter seal.

4. The filter press of claim 2, wherein the one or more filtration components comprise at least filter paper and a mesh screen interposing the filter seal and the pressure seal.

5. The filter press of claim 1, wherein the one or more venting ports provide fluid communication between the interior chamber and the surrounding environment when the cap seal advances out of the cell a predetermined distance.

6. The filter press of claim 1, further comprising:
   an inlet port defined in an end of the cell and being in fluid communication with the interior chamber; and
   an outlet port defined in the cap seal and in fluid communication with the interior chamber via a conduit defined in the longitudinal extension of the cap seal and extending between the outlet port and the interior chamber.

7. The filter press of claim 1, further comprising:
   a bottom surface defined on the retaining ring; and
   a shoulder extending radially from the longitudinal extension of the cap seal and defining a top surface configured to axially oppose the bottom surface of the retaining ring,
   wherein, as the retaining ring is threaded to the cell, the bottom surface is brought into contact with the top surface and thereby secures the cap seal to the cell.

8. The filter press of claim 7, further comprising:
   a first groove defined in the shoulder; and
   a second groove defined in an inner surface of the wall of the cell, wherein the first and second grooves cooperatively accommodate the one or more seals and the one or more filtration components.

9. The filter press of claim 1, further comprising markings defined on an exterior surface of each of the retaining ring and the cell.

10. The filter press of claim 9, wherein the markings are at least one of machined into the exterior surface of one or both of the cell and the retaining ring, welded to or cast into the exterior surface of one or both of the cell and the retaining ring, a sticker, a plastic or metal information plate, and grooves defined in the exterior surface of the cell and the retaining ring.

* * * * *